(12) United States Patent
Burkert et al.

(10) Patent No.: US 12,340,061 B2
(45) Date of Patent: Jun. 24, 2025

(54) USER-WORN DEVICE AND TOUCH-DEVICE FOR ULTRASONIC DATA TRANSMISSION

(71) Applicant: Telefonaktiebolaget LM Ericsson (publ), Stockholm (SE)

(72) Inventors: Till Burkert, Huddinge (SE); Lars Andersson, Solna (SE); Matthew John Lawrenson, Bussigny (CH); Julian Charles Nolan, Pully (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2 days.

(21) Appl. No.: 16/344,711

(22) PCT Filed: Oct. 25, 2016

(86) PCT No.: PCT/EP2016/075633
§ 371 (c)(1),
(2) Date: Apr. 24, 2019

(87) PCT Pub. No.: WO2018/077382
PCT Pub. Date: May 3, 2018

(65) Prior Publication Data
US 2019/0265844 A1 Aug. 29, 2019

(51) Int. Cl.
*G06F 3/0481* (2022.01)
*G06F 3/01* (2006.01)
(Continued)

(52) U.S. Cl.
CPC ............ *G06F 3/0481* (2013.01); *G06F 3/011* (2013.01); *G06F 3/04883* (2013.01);
(Continued)

(58) Field of Classification Search
CPC .................................................... G06F 3/0481
See application file for complete search history.

(56) References Cited

U.S. PATENT DOCUMENTS 8,941,619 B2 1/2015 Lee
2002/0009972 A1 1/2002 Amento et al.
(Continued)

FOREIGN PATENT DOCUMENTS

WO 2013/168170 A1 11/2013
WO 2015/158189 A1 10/2015

OTHER PUBLICATIONS

Singer, A. et al., "Mbps Experimental Acoustic Through-Tissue Communications: MEAT-COMMS", Coordinated Science Laboratory, University of Illinois at Urbana Champaign (Published in: 2016 IEEE 17th International Workshop on Signal Processing Advances in Wireless Communications (SPAWC) (Jul. 2016). (4 pages).
(Continued)

*Primary Examiner* — William Boddie
*Assistant Examiner* — Andrew B Schnirel
(74) *Attorney, Agent, or Firm* — Sage Patent Group

(57) ABSTRACT

A user-worn device (100) comprising an ultrasonic transducer configured for contacting a first body-part (116), e.g., a wrist, of a user and a touch-device (250) comprising an ultrasonic transducer (201) configured for contacting a second body-part (112), e.g., a finger, of the user are provided. The ultrasonic transducer comprised in the user-worn device (100) is further configured for transmitting data between the user-worn device (100) and the touch-device (250) encoded in ultrasound (121) via the second body-part (112). The user-worn device (100) is operative to receive, from the touch-device (250), an indication identifying data to be transmitted to the touch-device, select data for transmission to the touch-device (250) based on the received indication, and transmit the selected data to the touch-device (250). The touch-device (250) is operative to transmit, to the user-worn device (100), an indication identifying data to be transmitted (Continued)

to the touch-device (250), and receive the data from the user-worn device (100).

19 Claims, 8 Drawing Sheets

(51) Int. Cl.
    *G06F 3/04883*     (2022.01)
    *H04B 11/00*     (2006.01)
    *H04B 13/00*     (2006.01)
    *H04W 12/06*     (2021.01)

(52) U.S. Cl.
    CPC ........... *H04B 11/00* (2013.01); *H04B 13/005* (2013.01); *H04W 12/06* (2013.01); *G06F 2203/04808* (2013.01)

(56) References Cited

U.S. PATENT DOCUMENTS

| | | | |
|---|---|---|---|
| 2007/0120996 A1* | 5/2007 | Boillot | H04N 5/232 348/345 |
| 2013/0142363 A1 | 6/2013 | Amento et al. | |
| 2014/0055352 A1* | 2/2014 | Davis | A61B 5/0261 345/156 |
| 2016/0018948 A1* | 1/2016 | Parvarandeh | G06F 1/163 345/175 |
| 2016/0044463 A1* | 2/2016 | Lee | H04W 4/023 455/456.1 |
| 2016/0048231 A1 | 2/2016 | Kristensson et al. | |
| 2016/0071383 A1* | 3/2016 | Baldwin | G06F 3/00 340/407.1 |
| 2016/0085298 A1 | 3/2016 | Kristensson et al. | |
| 2017/0041084 A1* | 2/2017 | Du | G06F 3/011 |

OTHER PUBLICATIONS

Spelmezan, D. et al., "SkinHaptics: Ultrasound Focused in the Hand Creates Tactile Sensations", Haptics Symposium '16, Apr. 8-11, 2016, Philadelphia, Pennsylvania. (8 pages).

Kim, S. et al., "Transferring Data from Smartwatch to Smartphone through Mechanical Wave Propagation", Sensors 2015, 15, 21394-21406; doi:10.3390/s150921394. (Aug. 28, 2015). (13 pages).

International Search Report and Written Opinion dated Mar. 30, 2017 issued in International Application No. PCT/EP2016/075633. (12 pages).

European Office Action dated Sep. 2, 2019 issued in European Patent Application No. 16 788 488.1. (7 pages).

* cited by examiner

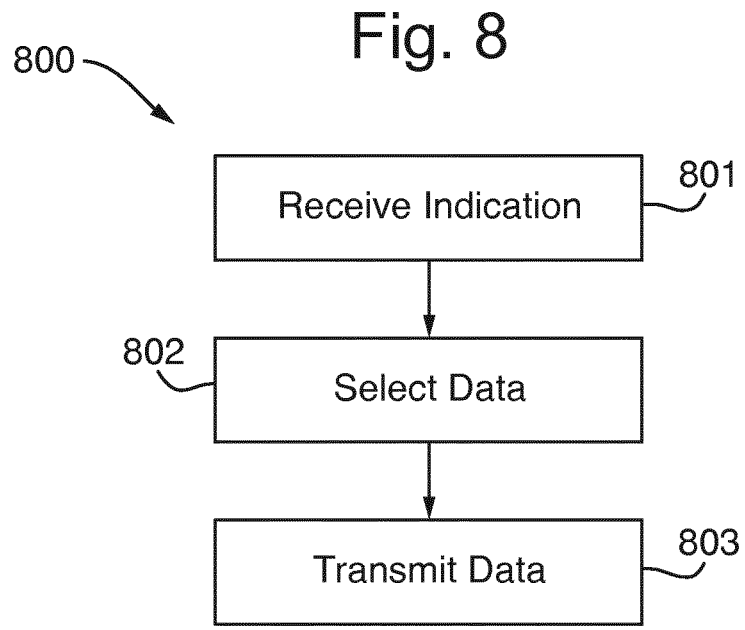
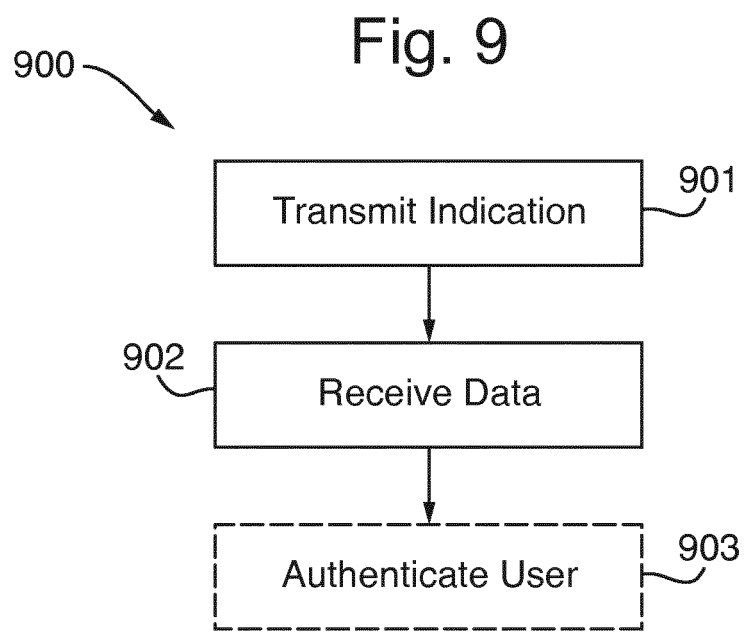

ial Stage of
USER-WORN DEVICE AND TOUCH-DEVICE FOR ULTRASONIC DATA TRANSMISSION

CROSS REFERENCE TO RELATED APPLICATION(S)

This application is a 35 U.S.C. § 371 National Stage of International Patent Application No. PCT/EP2016/075633, filed Oct. 25, 2016, designating the United States.

TECHNICAL FIELD

The invention relates to a user-worn device, a touch-device, a method performed by a user-worn device, a method performed by a touch-device, corresponding computer programs, and corresponding computer program products.

BACKGROUND

Communication between personal communications devices of a user, and with other communications devices which are in close proximity, is oftentimes effected by means of short-range radio-frequency technologies such as Bluetooth, Wireless Local Area Network (WLAN)/Wi-Fi, ZigBee, Near-Field Communication (NFC) or Radio-frequency identification (RFID), and the like. Such communications devices include, e.g., mobile terminals, mobile phones, smartphones, tablets, smartwatches and other wearable devices (aka "wearables"), laptops, personal computers, Internet-of-Things (IoT) or Machine-to-machine (M2M) devices, aka as "connected devices", contactless smart cards, such as credit cards or cards for access control and identification, and so forth.

Through-air communication based on a radio-frequency technology has the disadvantage of interference and possible interception of data by a malicious part, e.g., through eavesdropping or spoofing.

Also known are techniques for transmitting data via the human body, e.g., by means of small electric currents or electrostatic coupling. These techniques have certain drawbacks associated with it, such as dependence on the environment, limited bandwidth, and considerable signal loss.

It is also known to transmit data between two communications devices via the human body by means of ultrasound (see, e.g., "Transferring Data from Smartwatch to Smartphone through Mechanical Wave Propagation", by S.-C. Kim and S.-C. Lim, Sensors 2015, vol. 15, pages 21394-21406, MDPI, 2015; "Mbps Experimental Acoustic Through-Tissue Communications: MEAT-COMMS", by A. Singer, M. Oelze, and A. Podkowa, arXiv:1603.05269v1, published 16 Mar. 2016).

SUMMARY

It is an object of the invention to provide an improved alternative to the above techniques and prior art.

More specifically, it is an object of the invention to provide improved solutions for through-body ultrasound-based communications.

These and other objects of the invention are achieved by means of different aspects of the invention, as defined by the independent claims. Embodiments of the invention are characterized by the dependent claims.

According to a first aspect of the invention, a user-worn device is provided. The user-worn device comprises an ultrasonic transducer configured for contacting a first body-part, such as a wrist or an arm, of a user wearing the user-worn device. The ultrasonic transducer is further configured for transmitting data between the user-worn device and a touch-device. The data is encoded in ultrasound and transmitted via a second body-part, such as a finger, of the user, which is contacting the touch-device. The user-worn device further comprises processing means operative to receive an indication identifying data to be transmitted to the touch-device. The indication is received from the touch-device. The processing means is further operative to select data for transmission to the touch-device based on the received indication, and transmit the selected data to the touch-device.

According to a second aspect of the invention, a touch-device is provided. The touch-device comprises an ultrasonic transducer configured for contacting a second body-part, such as a finger, of a user wearing a user-worn device. The ultrasonic transducer is further configured for transmitting data between the user-worn device and the touch-device. The data is encoded in ultrasound and transmitted via the second body-part of the user. The touch-device further comprises processing means operative to transmit an indication identifying data to be transmitted to the touch-device. The indication is transmitted to the touch-device. The processing means is further operative to receive the data from the user-worn device.

According to a third aspect of the invention, a method performed by a user-worn device is provided. The user-worn device comprises an ultrasonic transducer configured for contacting a first body-part, such as a wrist or an arm, of a user wearing the user-worn device. The ultrasonic transducer is further configured for transmitting data between the user-worn device and a touch-device. The data is encoded in ultrasound and transmitted via a second body-part, such as a finger, of the user, which is contacting the touch-device. The method comprises receiving an indication identifying data to be transmitted to the touch-device. The indication is received from the touch-device. The method further comprises selecting data for transmission to the touch-device based on the received indication, and transmitting the selected data to the touch-device.

According to a fourth aspect of the invention, a method performed by a touch-device is provided. The touch-device comprises an ultrasonic transducer configured for contacting a second body-part, such as a finger, of a user wearing a user-worn device. The ultrasonic transducer is further configured for transmitting data between the user-worn device and the touch-device. The data is encoded in ultrasound and is transmitted via the second body-part of the user. The method comprises transmitting an indication identifying data to be transmitted to the touch-device. The indication is transmitted to the touch-device. The method further comprises receiving the data from the user-worn device.

According to a fifth aspect of the invention, a computer program is provided. The computer program comprises computer-executable instructions for causing a device to perform the method according to an embodiment of the third or fourth aspect of the invention, when the computer-executable instructions are executed on a processing unit comprised in the device.

According to a sixth aspect of the invention, a computer program product is provided. The computer program product comprises a computer-readable storage medium which has the computer program according to the fifth aspect of the invention embodied therein.

In the present context, a user-worn device is a computing device which is configured to be worn by a human user, e.g., on an arm or wrist of the user. An embodiment of the user-worn device may, e.g., be a watch, a smartwatch, a fitness tracker, an activity tracker, or any other type of wearable computing device, aka "wearable".

Further, a touch-device is a computing device which is configured for interaction with a user by means of touch, e.g., through a touch-sensitive surface for contacting the second body-part of the user, in particular a finger. The touch-sensitive surface may, e.g., be a touchpad of the type which is provided with laptops, or a touchscreen which is operative to provide a touch-based user-interface, as is common in smartphones and tablets. As is known in the art, touchpads and touchscreens enable the user to interact with the touch-device, and to control the touch-device, by means of touching the touchpad or touchscreen, and performing gestures, with one or more fingers. An embodiment of the touch-device may, e.g., be comprised in a mobile phone, a smartphone, a mobile terminal, a tablet, a computer display, a television, a door handle, a door knob, a door frame or door casing, a door panel, a device for access control, or a vending machine. Optionally, the ultrasonic transducer comprised in the touch-device may be embodied by a touchpad or a touchscreen which is capable of measuring pressure, in addition to determining the just the position of touch on the touchscreen or touchpad, to sufficient accuracy.

The invention makes use of an understanding that improved solutions for ultrasound-based through-body communications may be achieved by transmitting an indication from the touch-device to the user-worn device, for identifying data which is to be transmitted to the touch-device. In response to receiving the indication, the user-worn device selects data for transmission to the touch-device based on the received indication.

In the present context, ultrasonic communication is understood to be the usage of mechanical waves with a frequency higher than the upper audible frequency of humans, i.e., ultrasound, for transferring data between a transmitting ultrasonic transducer (ultrasonic transmitter) and a receiving ultrasonic transducer (ultrasonic receiver). Ultrasonic communication is advantageous in that it is a safe and secure method for through-body, or on-body, communications.

According to an embodiment of the invention, the indication identifying data to be transmitted to the touch-device is transmitted from the touch-device to the user-worn device encoded in ultrasound via the second body-part of the user. Advantageously, the same ultrasonic communication channel which is used for transmitting data, encoded in ultrasound, from the user-worn device to the touch-device, is also used for transmitting data in the reverse direction. Advantageously, solutions utilizing ultrasound-based through-body communications in both directions are less susceptible to eavesdropping than other wireless technologies.

According to another embodiment of the invention, the indication identifying data to be transmitted to the touch-device is transmitted by an out-of-band transmitter comprised in the touch-device and received by an out-of-band receiver comprised in the user-worn device. In other words, rather than transmitting the indication from the touch-device to the user-worn device encoded in ultrasound, an out-of-band channel is utilized. To this end, the indication may be transmitted using a radio-frequency wireless technology, coded light, audible sound, or the like. As an example, the indication may be a beacon, i.e., a signal which is transmitted, oftentimes at regular intervals, with a rather limited range of typically a few meters. The beacon may, e.g., be transmitted by an access control device, at a Point-of-Sale (PoS), or by a vending machine. Advantageously, by utilizing an out-of-band communication channel for transmitting the indication, the user-worn device may receive the indication identifying data which is to be transmitted to the touch-device prior to the user touching the touch-device, e.g., a touchscreen provided in the touch-device, with his/her finger. Thereby, the user-worn device may start transmitting data encoded in ultrasound before the user's finger actually contacts the touch-device. Advantageously, the duration of touch which is required for transmitting a certain amount of data from the user-worn device to the touch-device is reduced.

According to an embodiment of the invention, the ultrasonic transducer in the user-worn device comprises a phased array of ultrasonic transmitters which are configured for selectively focusing an acoustic energy of emitted ultrasound to at least two fingers of the user. Further, the user-worn device is operative to transmit different data to the touch-device via the at least two fingers of the user. In other words, the data which is transmitted from the user-worn device to the touch-device is dependent on which finger is used for contacting the touch-device. Thereby, spatial functionality is added which may be used for improving user-interaction with the touch-device. To this end, the interaction of the user with an embodiment of the touch-device comprising a touchscreen may be improved by making actions which the touch-device initiates in response to being touched by a finger of the user be dependent on the finger used for touching the touchscreen. As an example, by touching a social-network icon which is displayed on the touchscreen, the user may either initiate posting a message or posting a picture, depending on which finger is used for touching the icon. This is achieved by transmitting, from the user-worn device, different data to the distinct fingers, e.g., different control data based on which the touch-device initiates a corresponding action. As a further example, the user may select the case of letters, uppercase or lowercase, when typing on a virtual keyboard displayed on a touchscreen, by using different fingers.

According to an embodiment of the invention, the touch-device further comprises a touchscreen, and the indication identifying data to be transmitted to the touch-device is transmitted in response to detecting that the second body-part, e.g., a finger, of the user touches the touchscreen. In addition, the indication identifying data to be transmitted to the touch-device is dependent on a location of touch of the second body-part of the user on the touchscreen. Thereby, spatial functionality is added which may be used for improving user-interaction with the touch-device. For instance, the indication, or the information it comprises, may be dependent on the user-interface object, e.g., an icon or app, which the user touches. As an example, when the user touches a Facebook icon displayed on a certain location on the touchscreen, the indication which is sent to the user-worn device may be used for requesting Facebook login credentials, which subsequently are transmitted from the user-worn device, via the second body-part, e.g., a finger, to the touch-device.

Even though advantages of the invention have in some cases been described with reference to embodiments of the first and second aspects of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 8 shows a method performed by the user-worn device, in accordance with embodiments of the invention.

FIG. 9 shows a method performed by the touch-device, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

The embodiments described herein enable through-body communications of data between a user-worn device, such as a watch, a smartwatch, a fitness tracker, an activity tracker, or any other type of wearable computing device, aka "wearable", and a touch-device. This is achieved by transmitting data from the user-worn device to the touch-device encoded in ultrasound, via a first body-part of the user on which the user-worn device is worn, e.g., an arm or a wrist of the user, and a second body-par of the user, such as a finger, contacting the touch-device. The touch-device may, e.g., be embodied in the form of a touchpad, touchscreen, or any other dedicated touch-surface comprised in the touch-device. An embodiment of the touch-device may, e.g., be comprised in a mobile phone, a smartphone, a mobile terminal, a tablet, a computer display, a television, a door handle, a door knob, a door frame or door casing, a door panel, a device for access control, or a vending machine.

Figure 1:
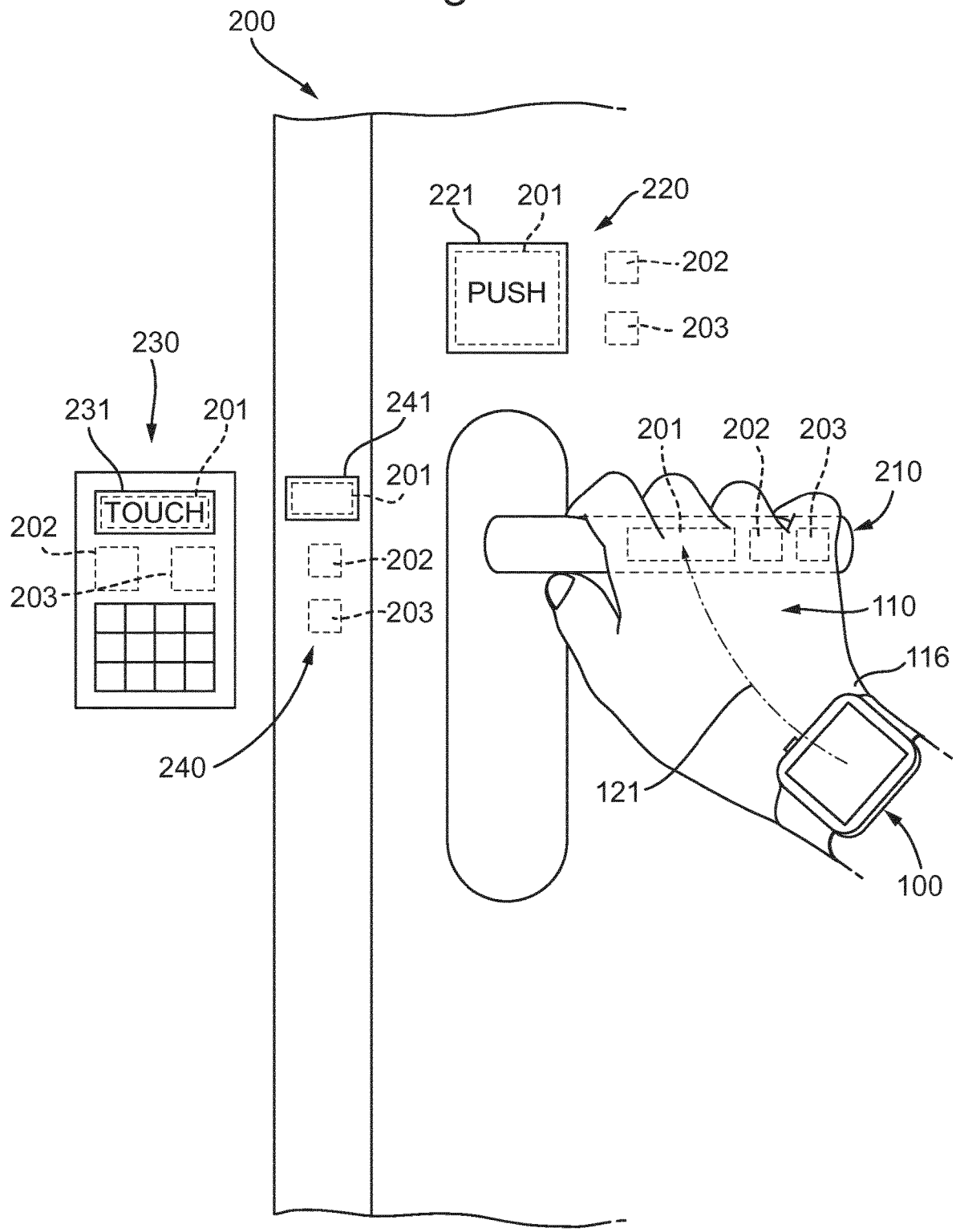
FIG. 1 illustrates ultrasonic data transmission between the user-worn device and the touch-device, in accordance with embodiments of the invention.

In FIG. 1, ultrasonic data transmission between a user-worn device and a touch-device is illustrated, in accordance with embodiments of the invention. The user-worn device is in FIG. 1 illustrated as a smartwatch 100 worn around a wrist 116 of the user, and is shown in further detail in FIG. 5. Four different embodiments of the touch-device are exemplified in FIG. 1. More specifically, the touch-device may be comprised in a door handle 210 of a door 200 or embedded into a door panel 220 of door 200. Alternatively, the touch-device may be comprised in an access control device 230 which is similar to the known types of access control devices in the form of a key pad or card reader, mounted next to door 200. As yet a further alternatively, an embodiment of the touch-device may also be embedded into a door frame 240 (or door casing) of door 200, rather than into door panel 220. Advantageously, the user of user-worn device 100 may unlock door 200 simply by grasping door handle 210 or touching door panel 220, door frame 240, or access control device 230. Preferably, a label 221, 231, or 241, may be provided to indicate a region for where the user is expected to touch with his/her hand 110 or fingers 112/113.

Figure 2:
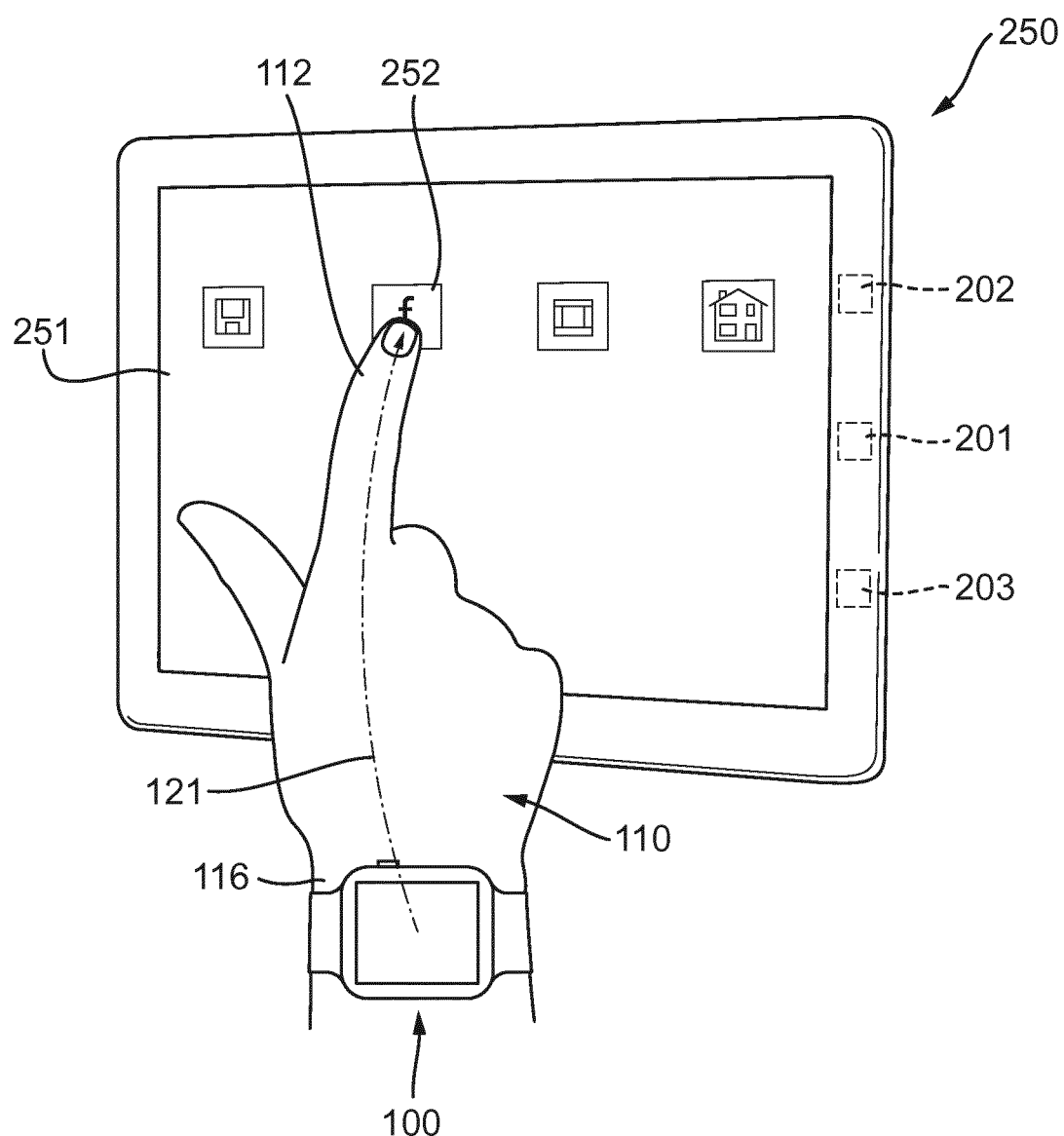
FIG. 2 illustrates ultrasonic data transmission between the user-worn device and the touch-device, in accordance with another embodiment of the invention.
Figure 3:
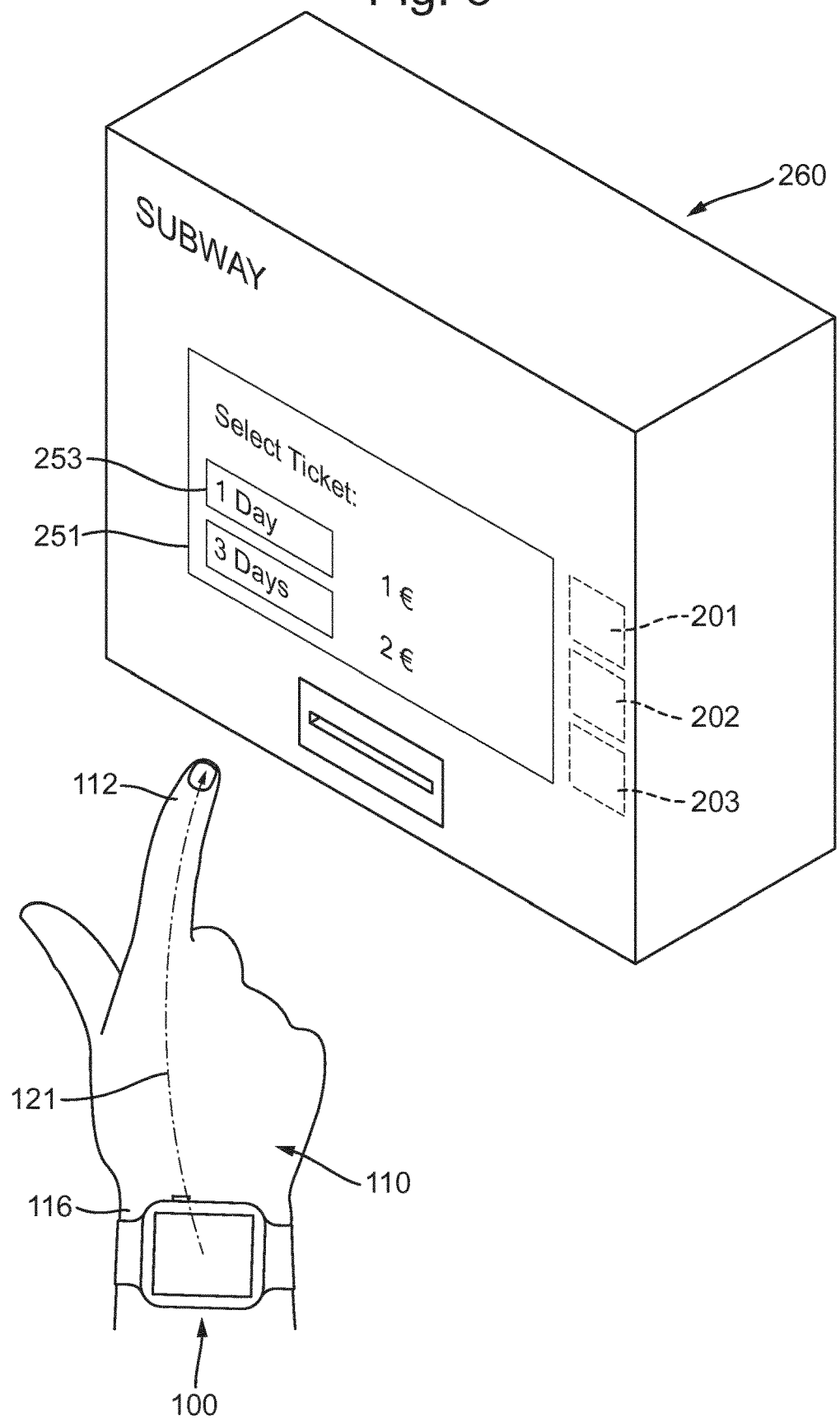
FIG. 3 illustrates ultrasonic data transmission between the user-worn device and the touch-device, in accordance with a further embodiment of the invention.
Figure 4:
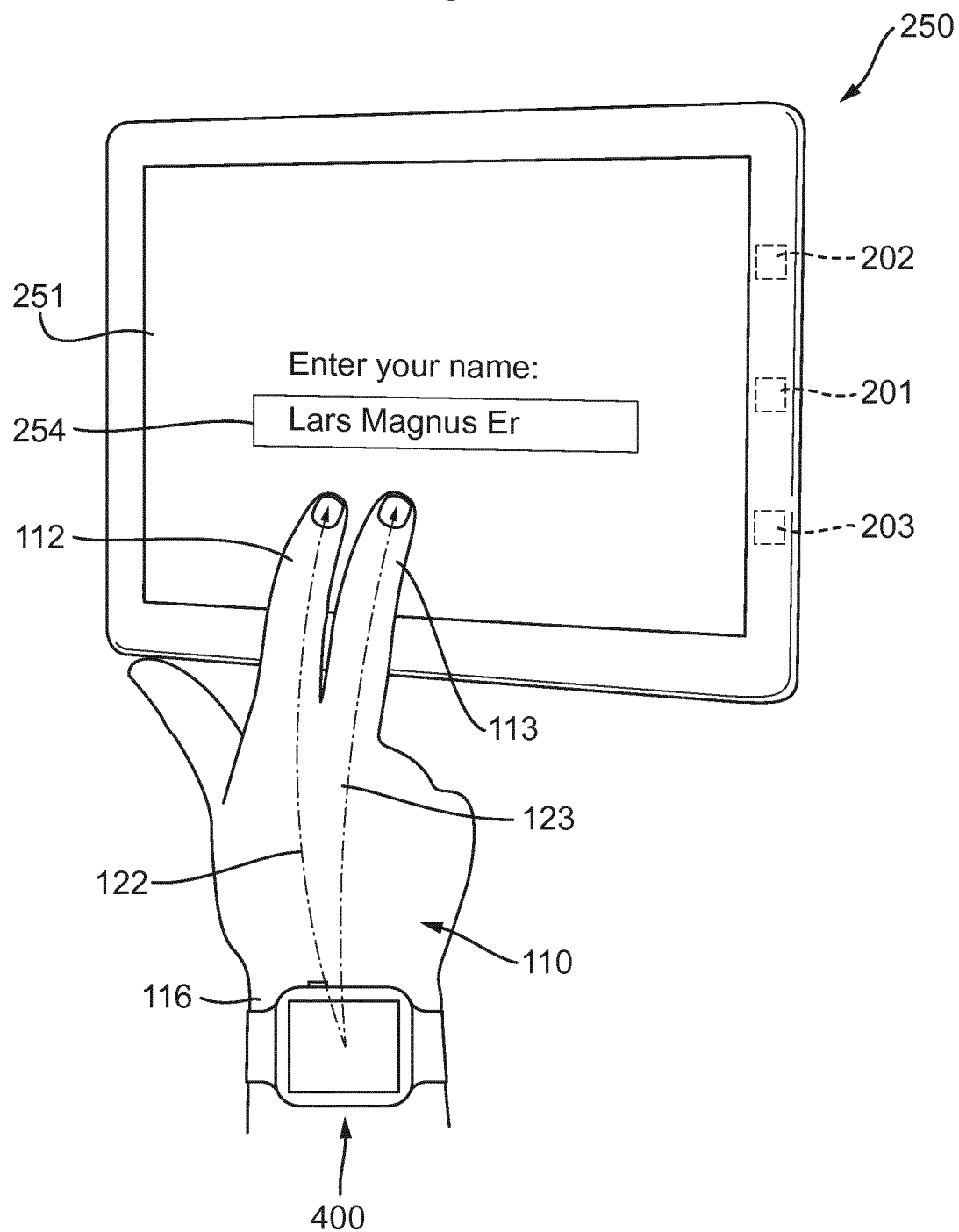
FIG. 4 illustrates ultrasonic data transmission between the user-worn device and the touch-device, in accordance with yet another embodiment of the invention.

Ultrasonic data transmission between a user-worn device and a touch-device is also illustrated in FIGS. 2 to 4, in accordance with further embodiments of the invention. Whereas the user-worn device is illustrated in FIGS. 2 to 4 in the form of smartwatch 100, as in FIG. 1, the touch-device is in FIGS. 2 and 4 shown as a computing device 250 comprising a touchscreen 251, e.g., a tablet, a smartphone, or a phablet (a class of mobile computing devices designed to combine or straddle the size format of smartphones and tablets). In FIG. 3, the touch-device is illustrated as a vending machine 260 for offering items for sale, e.g., subway tickets.

Figure 5:
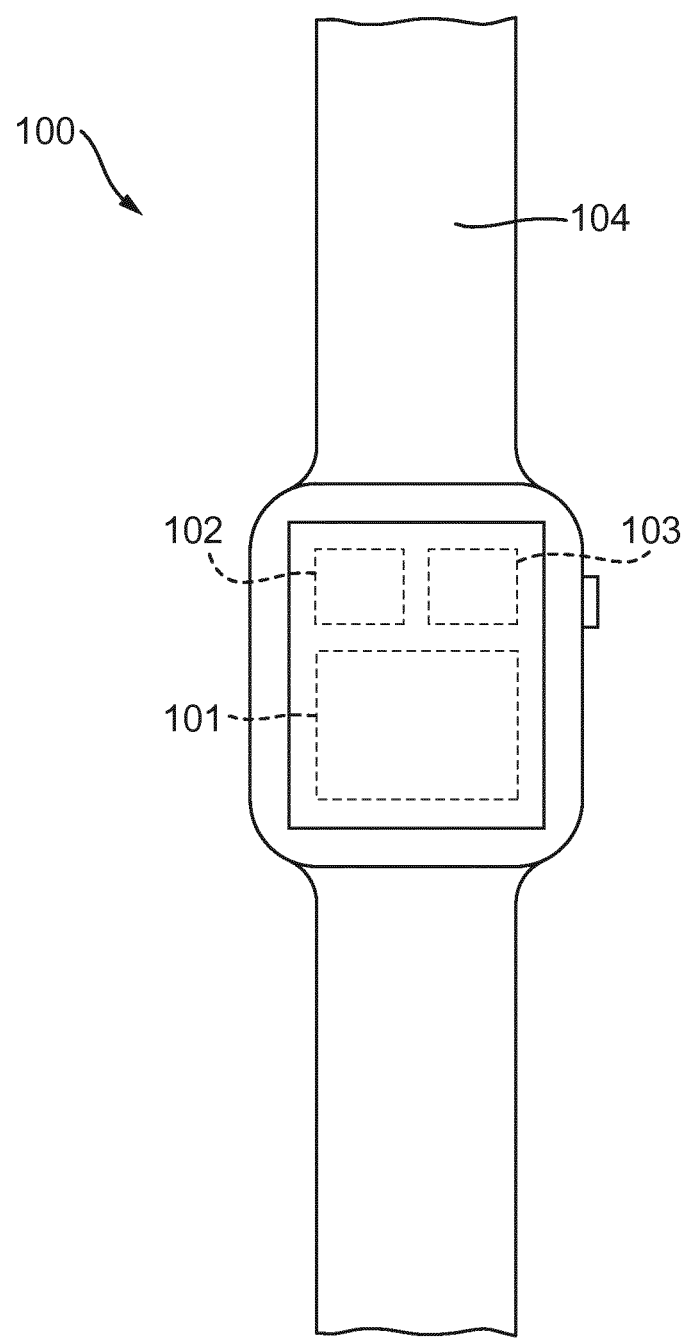
FIG. 5 shows the user-worn device comprising an ultrasonic transducer for transmitting data to the touch-device, in accordance with an embodiment of the invention.

With reference to FIG. 5, user-worn device 100 comprises an ultrasonic transducer 101 configured for contacting a first body-part of a user, such as wrist 116 or an arm, wearing user-worn device 110. Ultrasonic transducer 101 is further configured for transmitting data encoded in ultrasound (indicated by arrows 121-123 in FIGS. 1 to 4) between user-worn device 100 and touch-device 210, 220, 230, 250, or 260, (in the remainder abbreviated as 210-260) via a second body-part of the user, such as a hand 110 or a finger 112/113 thereof, contacting touch-device 210-260. User-worn device 100 further comprises processing means 102 operative to receive, from touch-device 210-260, an indication identifying data to be transmitted to touch-device 210-260. Processing means 102 is further operative to, in response to receiving the indication, select data for transmission to touch-device 210-260 based on the received indication, and transmit the selected data to touch-device 210-260. The data is transmitted encoded in ultrasound 121-123 via first body-part 116 and second body-part 110/112/113. Preferably, user-worn device 100 comprises a wristband 104 for wearing user-worn device 100 around wrist 116. User-worn device 100 may alternatively be configured to be worn around an arm of the user.

With reference to FIGS. 1 to 4, touch-device 210-260 comprises an ultrasonic transducer 201 configured for contacting second body-part 110/112/113 of the user wearing user-worn device 100. Ultrasonic transducer 201 is further configured for receiving data transmitted by user-worn device 100 to touch-device 210-260. The data is transmitted encoded in ultrasound 121-123 and transmitted via first body-part 116 and second body-part 110/112/113. Touch-device 210-260 further comprises processing means 202 operative to transmit, to user-worn device 100, an indication identifying data to be transmitted to touch-device 210-260, and receive the data from user-worn device 100.

Optionally, the indication identifying data to be transmitted to touch-device 210-260 is transmitted by ultrasonic transducer 201 comprised in touch-device 210-260 and received by ultrasonic transducer 101 comprised in user-worn device 100. The data is encoded in ultrasound and transmitted via second body-part 110/112/113 and first body-part 116, i.e., via the same ultrasonic communication channel which is used for transmitting data encoded in ultrasound 121-123 from user-worn device 100 to touch-device 210-260, but in the reverse direction.

As an alternative to utilizing an ultrasonic communication channel for transmitting the indication identifying data to be transmitted to touch-device 210-260 from touch-device 210-260 to user-worn device 100, the indication may be transmitted by an out-of-band transmitter 203 comprised in touch-device 210-260 and received by an out-of-band receiver 103 comprised in user-worn device 100. For instance, the indication may be transmitted by out-of-band transmitter 203 using any known radio-frequency technology, in particular short-ranged technologies like Bluetooth, ZigBee, WLAN/Wi-Fi, by means of Visual Light Communication (VLC) or modulated Infrared (IR) light, or by means of audible sound. Depending on the technology used for the out-of-band channel, out-of-band transmitter 203 may, e.g., be a Bluetooth, ZigBee, or WLAN/Wi-Fi communications module, a VLC or IR transmitter, or a loudspeaker, respectively. Correspondingly, out-of-band receiver 103 may, e.g., be a Bluetooth, ZigBee, or WLAN/Wi-Fi communications module, a VLC or IR receiver, or a microphone, respectively. It will be appreciated that embodiments of user-worn device 100 may alternatively comprise an out-of-band transceiver 103, or communications module, operative for transmitting and receiving signals or messages via an out-of-band communications channel. Correspondingly, embodiments of touch-device 210-260 may comprise an out-of-band transceiver 203, or communications module, operative for transmitting and receiving signals or messages via an out-of-band communications channel.

The indication identifying data to be transmitted to touch-device 210-260, which indication is transmitted from touch-device 210-260 to user-worn device 100, comprises at least one of information identifying the data to be transmitted (e.g., "Access credentials for Facebook"), an identifier of touch-device 210-260 (e.g., "Vending machine for Stockholm subway"), a location of touch-device 210-260 (e.g., "Building 18, entrance Torshamnsgatan"), and information identifying a service which is accessible through touch-device 210-260 (e.g., "Facebook").

As an example, user-worn device 100 may transmit authentication credentials for access control. The authentication credentials are transmitted by user-worn device 100 in response to receiving the indication identifying data to be transmitted to touch-device 210-260 from touch-device 210-260. The indication may, e.g., be a beacon which is transmitted by out-of-band transmitter 203 comprised in touch-device 210-260, or in an associated transmitter which is provided with touch-device 210-260. A beacon is a signal which is transmitted, oftentimes at regular intervals, with a rather limited range, typically a few meters.

For the example illustrated in FIG. 1, the identification may comprise information identifying door 200, a location of door 200, or a building or location accessible through door 200, thereby enabling user-worn device 100 to transmit required authentication credentials to touch-device 210-240 for unlocking door 200 so that the user can gain access to the building or location.

As another example, with reference to FIG. 2, touch-device 250 may transmit the indication if it detects touch, e.g., the user touching a specific app or icon 252 which is displayed on touchscreen 251 with finger 112. In this case, the indication identifying data to be transmitted to touch-device 250 may optionally be dependent on a location of touch of finger 112 on touchscreen 251. In other words, based on the touched app/icon 252, which is identified based on the location of touch on touchscreen 251, as is known in the art, the indication may, e.g., comprise information identifying data which is required by an application or a service which is associated with the touched app/icon 252. As an example, if the user touches an app/icon 252 which is associated with a service provided over the Internet, e.g., a social network community such as Facebook or an online banking service, touch-device 250 may request authentication credentials of the user for accessing the service from user-worn device 100 which, in response to receiving the indication, transmits the login credentials to touch-device 250. In response to receiving the authentication credentials transmitted by user-worn device 100, touch-device 250 may optionally authenticate the user to the application or service.

As yet a further example, illustrated in FIG. 3, the indication identifying data to be transmitted to the touch-device in the form of a beacon may, e.g., be transmitted by a PoS or by a vending machine 260. In such scenarios, the indication may identify the data to transmitted to a PoS or vending machine 260, to be credit card information or other information which can be used for effecting a financial transaction. Advantageously, by utilizing an out-of-band communication channel for transmitting the indication, user-worn device 100 may receive the indication, via out-of-band receiver 103, identifying data which is to be transmitted to touch-device 260 prior to the user touching touch-device 260 with finger 112, e.g., a touchscreen 251 provided in touch-device 260. Thereby, user-worn device 100 may start transmitting data encoded in ultrasound before finger 112 actually contacts touchscreen 251. In the case of vending machine 260, e.g., user-worn device 100 may transmit credit card information, an account number, or the like, to touch-device 260 once the user touches touchscreen 251 with finger 112, thereby completing the path for transmitting data encoded in ultrasound through the user's body. As is illustrated in FIG. 3, vending machine 260 may, e.g., offer a selection of items for purchase, such as subway tickets. Upon selecting an item 253 displayed on touchscreen 251, the credit card information is transmitted from user-worn device 100 to touch-device 260 which, in response to receiving the information, can initiate the financial transaction and deliver the selected item to the user.

In FIG. 4, a further embodiment 400 of the user-worn device is illustrated. User-worn device 400 is similar to user-worn device 100 described with reference to FIGS. 1 to 3 and FIG. 5, in that it comprises an ultrasonic transducer 101 configured for contacting a first body-part, such as wrist 116 or an arm, of a user wearing user-worn device 400, and transmitting data between user-worn device 400 and a touch-device 250, which in FIG. 4 is similar to touch-device 250 described with reference to FIG. 2. The data is transmitted encoded in ultrasound via a second body-part, e.g., finger 112, of the user contacting touch-device 250. User-worn device 400 further comprises processing means 102 operative to receive, from touch-device 250, an indication identifying data to be transmitted to touch-device 250, select data for transmission to touch-device 250 based on the received indication, and transmit the selected data to touch-device 250. In contrast to user-worn device 100 described with reference to FIGS. 1 to 3, ultrasonic transducer 101 comprised in touch-device 400 comprises a phased array of ultrasonic transmitters which are configured for selectively focusing an acoustic energy of emitted ultrasound to at least two fingers 112 and 113 of the user. In addition, user-worn device 400 is operative to transmit different data to touch-device 250 via the at least two fingers 112/113 of the user. This may be achieved by utilizing time-reversal based beam-forming techniques which allow focusing ultrasonic energy to specific locations of the user's body, e.g., a finger 112/113, as is described in "SkinHaptics: Ultrasound Focused in the Hand Creates Tactile Sensations", by D. Spelmezan, R. Morales González, S. Subramanian, 2016 IEEE Haptics Symposium (HAPTICS), pages 98-105, 2016. In this way, different data may be transmitted to different body-parts, e.g., two fingers 112 and 113. The different data may, e.g., comprise control information for controlling the operation or behavior of touch-device 250.

As an example, illustrated in FIG. 4, user-worn device 400 may be operative to transmit a first type of data to a first finger 112, e.g., the index finger, and a second type of data to a second finger 113, e.g., the middle finger. The different types of data may, e.g., be control information enabling the user to type a lower-case letter (e.g., "r"), using index finger 112, or an upper-case letter (e.g., "E"), using middle finger 113, in a text field 254 displayed on touchscreen 251. This may be achieved by transmitting control information comprised in the data transmitted by user-worn device 400 which controls touch-device 250 to enter a letter of the intended case. To this end, the control information transmitted to index finger 112 is by touch-device 250 interpreted as "lower case", whereas the control information transmitted to middle finger 113 is by touch-device 250 interpreted as "upper case". In this way, the user may type text on touchscreen 251, alternating between lower-case and upper-case letters, without the need to hit the "Shift" key for toggling between lower and upper case.

As a further example, the user may initiate different functionality when touching app/icon 252 displayed on touchscreen 251 (as is illustrated in FIG. 2), depending on which finger is used. For instance, the user may select to post a message by using a first finger, e.g., index finger 112, or to post a picture, by using a second finger, e.g., middle finger 113. This is achieved by transmitting corresponding control information via the different fingers 112 and 113, and which is associated with corresponding functionality.

As yet a further example, the user may select different means of paying for a purchase when using vending machine 260 shown in FIG. 3. For instance, by transmitting information pertaining to a first credit card to index finger 112, and information pertaining to a second credit card to middle finger 113, the user may select one of the first credit card and the second credit card when selecting item 253 for purchase.

In the following, embodiments of ultrasonic transducers 101 and 201 are described in more detail.

Ultrasonic transducers are transducers which convert electrical signals into ultrasonic waves, i.e., ultrasound, or vice versa. For some of the embodiments described herein, it suffices that ultrasonic transducer 101, comprised in user-worn device 100, is configured for converting electrical signals originating from processing means 102 into ultrasound, which is transmitted via the user's first body-part 116 and the user's second body-part 110/112/113 to ultrasonic transducer 201, comprised in touch-device 210-260. Ultrasonic transducer 201 is configured for converting the received ultrasonic waves into electrical signals for subsequent processing by processing means 202. For embodiments of the invention which utilize ultrasound for transmitting the indication identifying data to be transmitted to touch-device 210-260, which indication is transmitted from touch-device 210-260 to user-worn device 100, ultrasonic transducer 101 is further configured for converting ultrasonic waves into electrical signals, and ultrasonic transducer 201 is further configured for converting electrical signals into ultrasonic waves.

Ultrasonic transducers typically generate sound waves in the ultrasonic range, above 18 kHz, by turning electrical energy into sound. To this end, an ultrasonic transducer is a device that converts Alternating Current (AC) into ultrasound, and/or the reverse, ultrasound into AC. Ultrasonic transducers may be implemented based on a number of technologies known in the art, including piezoelectric transducers or capacitive transducers. In piezoelectric transducers, piezoelectric crystals are utilized which change size and shape when a voltage is applied. Accordingly, an applied AC voltage makes them oscillate at the same frequency as the AC voltage, and ultrasonic waves may be produced by selecting an appropriate frequency. Capacitive transducers on the other hand use electrostatic fields which are applied between a conductive diaphragm and a backing plate. Similar to piezoelectric transducers, they oscillate at the same frequency as an applied AC voltage.

The diaphragm, or membrane, principle is also used in Micro-machined Ultrasonic Transducers (MUTs). These devices are fabricated using silicon Micro-Electromechanical systems (MEMS) technology, which is particularly useful for the fabrication of transducer arrays. The vibration of the diaphragm may be induced, or detected, electronically using the capacitance between the diaphragm and a closely spaced backing plate, or by adding a thin layer of piezoelectric material on diaphragm. Alternatively, the vibration of the diaphragm may also be measured by a tiny optical ring resonator integrated inside the diaphragm.

As a further alternative, ultrasound transducers may also rely on magnetostrictive materials, which have the property to change size slightly when exposed to a magnetic field.

Embodiments of the invention may utilize ultrasonic transducers 101 and 201 comprising separate transmitters and receivers, or ultrasonic transducers 101 and 201 comprising ultrasonic transmitters and receivers combined into single units.

In embodiments of the invention, ultrasonic transducers 101 and 201 are utilized for transmitting data encoded in ultrasound 121-123 via ultrasonic communication channels, i.e., via the body of the user wearing user-worn device 100 on a first body-part 116, and touching touch-device 210-260 with the second body-part 110/112/113. The data is encoded into ultrasound by modulating one or more properties of ultrasonic waves transmitted from ultrasonic transducer 101, comprised ion user-worn device 100, to ultrasonic transducer 201, comprised in touch-device 210-260, or vice versa, as is known in the art. The one or more properties of ultrasonic waves which can be modulated for encoding data include, but are not limited to, frequency, amplitude, and phase, of the ultrasonic waves. Transmitting data by modulating ultrasonic waves is, e.g., described in WO 2013/168170 A1.

As an alternative to providing touch-device 210-260 with a dedicated ultrasonic transducer 210, embodiments of the invention may also utilize a touchscreen 251 comprised in the touch-device, such as in tablet 250 or vending machine 260, as ultrasonic transducer, and in particular as ultrasonic receiver. This is the case since some types of touchscreens are capable of detecting a change in pressure when being touched, e.g., by finger 112/113, with sufficient high accuracy, and to resolve such changes in pressure with sufficient high frequency so as to convert ultrasonic waves which are received via finger 112/113 into an electric signal. There are several sensing technologies available to detect touch and pressure, of which capacitive sensors are the most common in consumer electronics like smartphones and tablets. In particular new generations of touchscreens frequently include pressure sensors which utilize small changes in reflections of the backlight of the touchscreen to measure pressure with high accuracy. This sensing technology can easily distinguish between different forces which are exerted on the screen by the touch of a finger.

Touchscreens which are based on ultrasonic transducers are, e.g., also known from US 2013/0127783 A1.

Advantageously, by utilizing a touchscreen comprised in an embodiment of the touch-device, such as touchscreen 251 comprised in touch-devices 250 and 260, as ultrasonic receiver, embodiments of the invention may easily be implemented based on existing touchscreen technology.

In the following, embodiments of processing means 102, comprised in user-worn device 100, are described with reference to FIGS. 6A and 6B.

Figure 6A:
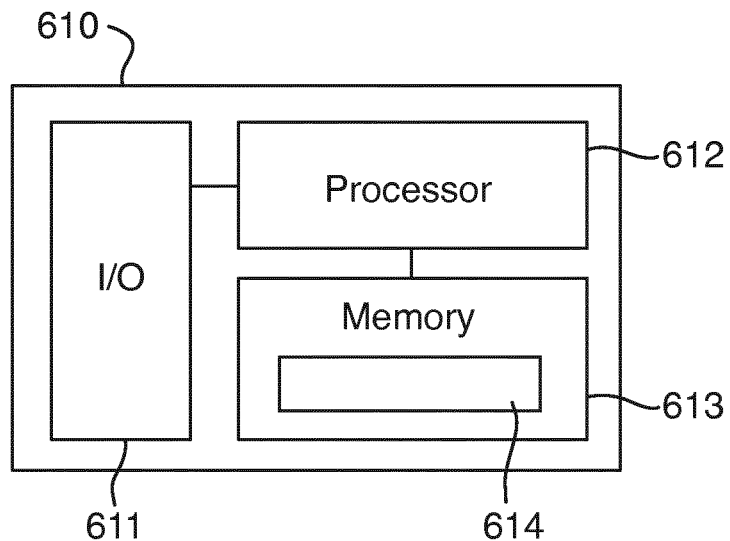
FIGS. 6A and 6B show embodiments of the processing means comprised in the user-worn device.

In FIG. 6A, a first embodiment 610 of processing means 102 is shown. Processing means 610 comprises a processing unit 612, such as a general purpose processor, and a computer-readable storage medium 613, such as a Random Access Memory (RAM), a Flash memory, or the like. In addition, processing means 610 comprises one or more interfaces 611 ("I/O" in FIG. 6A) for controlling and/or receiving information from other components comprised in user-worn device 100, such as ultrasonic transducer 101 and out-of-band receiver (or communications module) 103. Memory 613 contains computer-executable instructions 614, i.e., a computer program, for causing user-worn device 100 to perform in accordance with embodiments of the invention as described herein, when computer-executable instructions 614 are executed on processing unit 612. In particular, user-worn device 100 is operative to receive, from the touch-device, an indication identifying data to be transmitted to the touch-device, select data for transmission to the touch-device based on the received indication, and transmit the selected data to the touch-device.

The indication identifying data to be transmitted to the touch-device may, e.g., be received, by ultrasonic transducer 101 comprised in user-worn device 100, from the touch-device encoded in ultrasound via the second body-part of the user. Alternatively, the indication identifying data to be transmitted to the touch-device may be received from the touch-device by an out-of-band receiver 103 comprised in user-worn device 100.

Optionally, ultrasonic transducer 101 comprises a phased array of ultrasonic transmitters configured for selectively focusing an acoustic energy of emitted ultrasound to at least two fingers of the user, and user-worn device 100 is operative to transmit different data to the touch-device via the at least two fingers of the user.

Figure 6B:
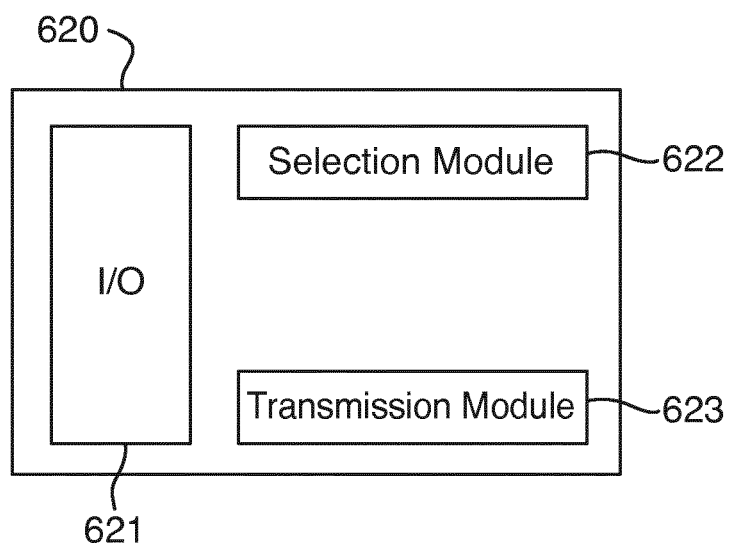

In FIG. 6B an alternative embodiment 620 of processing means 102 is illustrated. Similar to processing means 610, processing means 620 comprises one or more interfaces 621 ("I/O" in FIG. 6B) for controlling and/or receiving information from other components comprised in user-worn device 100, such as ultrasonic transducer 101 and out-of-band receiver (or communications module) 103. Processing means 620 further comprises a selection module 622 and a transmission module 623, which are configured for causing user-worn device 100 to perform in accordance with embodiments of the invention as described herein. In particular, selection module 622 is configured for selecting data for transmission to the touch-device based on a received indication identifying data to be transmitted to the touch-device, and transmission module 623 is configured for transmitting the selected data to the touch-device.

The indication identifying data to be transmitted to the touch-device may, e.g., be received, by ultrasonic transducer 101 comprised in user-worn device 100, from the touch-device encoded in ultrasound via the second body-part of the user. Alternatively, the indication identifying data to be transmitted to the touch-device may be received from the touch-device by an out-of-band receiver 103 comprised in user-worn device 100.

In the following, embodiments of processing means 202, comprised in touch-device 210-260, are described with reference to FIGS. 7A and 7B.

Figure 7A:
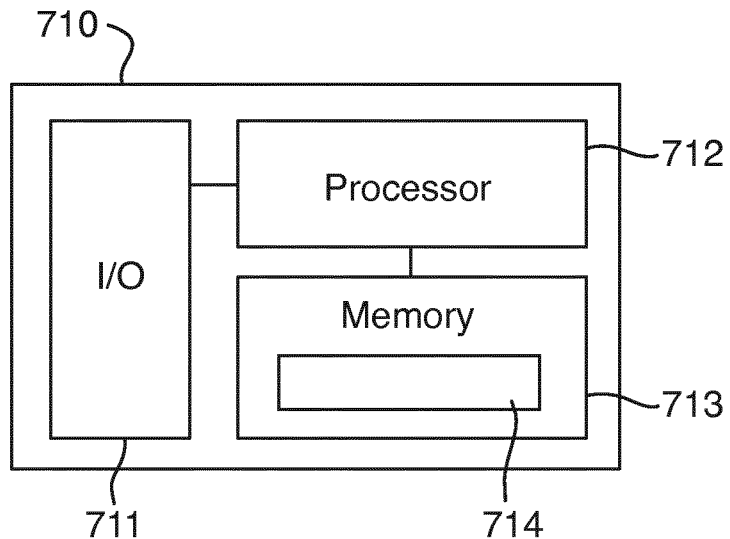
FIGS. 7A and 7B show embodiments of the processing means comprised in the touch-device.

In FIG. 7A, a first embodiment 710 of processing means 202 is shown. Processing means 710 comprises a processing unit 712, such as a general purpose processor, and a computer-readable storage medium 713, such as a RAM, a Flash memory, or the like. In addition, processing means 710 comprises one or more interfaces 711 ("I/O" in FIG. 7A) for controlling and/or receiving information from other components comprised in touch-device 210-260, such as ultrasonic transducer 201, out-of-band transmitter (or communications module) 203, and optionally touchscreen 251. Memory 713 contains computer-executable instructions 714, i.e., a computer program, for causing touch-device 210-260 to perform in accordance with embodiments of the invention as described herein, when computer-executable instructions 714 are executed on processing unit 712. In particular, touch-device 210-260 is operative to transmit, to the user-worn device, an indication identifying data to be transmitted to touch-device 210-260, and receive the data from the user-worn device.

The indication identifying data to be transmitted to touch-device 210-260 may, e.g., be transmitted, by ultrasonic transducer 201 comprised in touch-device 210-260, to the user-worn device encoded in ultrasound via the second body-part of the user. Alternatively, the indication identifying data to be transmitted to touch-device 210-260 may be transmitted to the user-worn device by an out-of-band transmitter 203 comprised in touch-device 210-260.

Optionally, if touch-device 210-260 comprises a touchscreen 251, the indication identifying data to be transmitted to touch-device 210-260 is transmitted in response to detecting that the second body-part of the user touches touchscreen 251, and the indication identifying data to be transmitted to touch-device 210-260 is dependent on a location of touch of the second body-part of the user on touchscreen 251.

Optionally, if the data transmitted to touch-device 210-260 comprises authentication credentials of the user, touch-device 210-260 may further be operative to authenticate the user in response to receiving the authentication credentials.

Figure 7B:
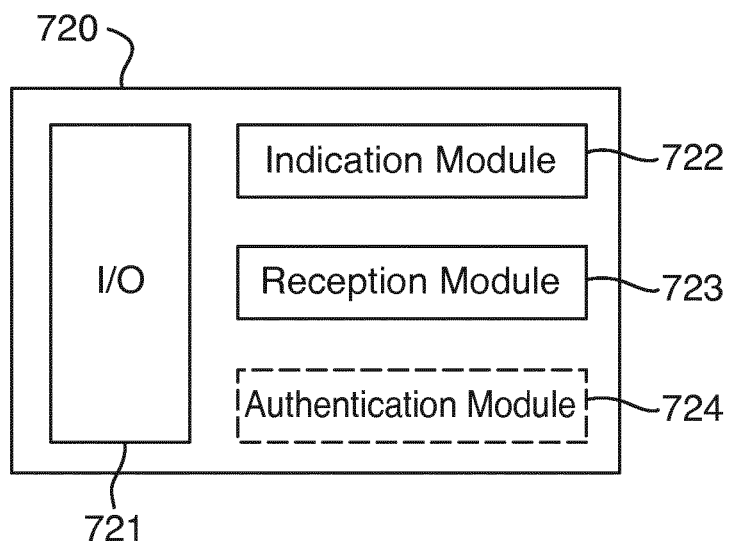

In FIG. 7B, an alternative embodiment 720 of processing means 202 is illustrated. Similar to processing means 710, processing means 720 comprises one or more interfaces 721 ("I/O" in FIG. 7B) for controlling and/or receiving information from other components comprised in touch-device 210-260, such as ultrasonic transducer 201, out-of-band transmitter (or communications module) 203, and optionally touchscreen 251. Processing means 720 further comprises an indication module 722 and a reception module 723, which are configured for causing touch-device 210-260 to perform in accordance with embodiments of the invention as described herein. In particular, indication module 722 is configured for transmitting, to the user-worn device, an indication identifying data to be transmitted to touch-device 210-260, and reception module 723 is configured for receiving the data from the user-worn device.

The indication identifying data to be transmitted to touch-device 210-260 may, e.g., be transmitted, by ultrasonic transducer 201 comprised in touch-device 210-260, to the user-worn device encoded in ultrasound via the second body-part of the user. Alternatively, the indication identifying data to be transmitted to touch-device 210-260 may be transmitted to the user-worn device by an out-of-band transmitter 203 comprised in touch-device 210-260.

Optionally, if touch-device 210-260 comprises a touchscreen 251, indication module 722 is configured for transmitting the indication identifying data to be transmitted to touch-device 210-260 in response to detecting that the second body-part of the user touches touchscreen 251, and the indication identifying data to be transmitted to touch-device 210-260 is dependent on a location of touch of the second body-part of the user on touchscreen 251.

Optionally, touch-device 210-260 may further comprise an authentication module 724 configured for authenticating the user in response to receiving the authentication credentials which are comprised in the data transmitted to touch-device 210-260.

Interface(s) 611, 621, 711, and 721, and modules 622, 623, and 722-724, as well as any additional modules comprised in processing means 620 or 720, may be implemented by any kind of electronic circuitry, e.g., any one, or a combination of, analogue electronic circuitry, digital electronic circuitry, and processing means executing a suitable computer program.

In the following, embodiments 800 of the method performed by a user-worn device comprising an ultrasonic transducer configured for contacting a first body-part of a user wearing the user-worn device, and transmitting data between the user-worn device and a touch-device encoded in ultrasound via a second body-part of the user contacting the touch-device, are described with reference to FIG. 8. Method 800 may, e.g., be performed by a watch, a smartwatch, a fitness tracker, an activity tracker, or any other type of wearable computing device.

Method 800 comprises receiving 801, from the touch-device, an indication identifying data to be transmitted to the touch-device, selecting 802 data for transmission to the touch-device based on the received indication, and transmitting 803 the selected data to the touch-device. The indication identifying data to be transmitted to the touch-device may, e.g., be received 801 from the touch-device encoded in ultrasound via the second body-part of the user. Alternatively, the indication identifying data to be transmitted to the touch-device may be received 801 from the touch-device by an out-of-band receiver comprised in the user-worn device.

Optionally, if the ultrasonic transducer comprised in the user-worn device comprises a phased array of ultrasonic transmitters configured for selectively focusing an acoustic energy of emitted ultrasound to at least two fingers of the user, the transmitting 803 the selected data to the touch-device comprises transmitting different data to the touch-device via the at least two fingers of the user.

It will be appreciated that method 800 may comprise additional, or modified, steps in accordance with what is described throughout this disclosure. An embodiment of method 800 may be implemented as software, such as computer program 614, to be executed by a processing unit comprised in the user-worn device, whereby the user-worn device is operative to perform in accordance with embodiments of the invention described herein.

In the following, embodiments 900 of the method performed by a touch-device comprising an ultrasonic transducer configured for contacting a second body-part of a user wearing a user-worn device for transmitting data between the user-worn device and the touch-device encoded in ultrasound via the second body-part of the user, is described with reference to FIG. 9. Method 900 may, e.g., be performed by a mobile phone, a smartphone, a mobile terminal, a tablet, a computer display, a television, a door handle, a door knob, a door frame, a door panel, a device for access control, or a vending machine.

Method 900 comprises transmitting 901, to the user-worn device, an indication identifying data to be transmitted to the touch-device, and receiving 902 the data from the user-worn device. The indication identifying data to be transmitted to the touch-device may, e.g., be transmitted 901 to the user-worn device encoded in ultrasound via the second body-part of the user. Alternatively, the indication identifying data to be transmitted to the touch-device may be transmitted to the user-worn device by an out-of-band transmitter 203 comprised in the touch-device.

Optionally, if the touch-device comprises a touchscreen, the indication identifying data to be transmitted to the touch-device is transmitted 901 in response to detecting that the second body-part of the user touches the touchscreen, and the indication identifying data to be transmitted to the touch-device is dependent on a location of touch of the second body-part of the user on the touchscreen.

Optionally, if the data transmitted to the touch-device comprises authentication credentials of the user, method 900 may further comprise authenticating 903 the user in response to receiving the authentication credentials.

It will be appreciated that method 900 may comprise additional, or modified, steps in accordance with what is described throughout this disclosure. An embodiment of method 900 may be implemented as software, such as computer program 714, to be executed by a processing unit comprised in the user-worn device, whereby the user-worn device is operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A user-worn device comprising:
   an ultrasonic transducer configured for contacting a first body-part of a user wearing the user-worn device, and transmitting data between the user-worn device and a touch-device encoded in ultrasound via a second body-part of the user contacting the touch-device, and
   a processor being operative to:
   receive, from the touch-device, in response to the second body-part of the user contacting the touch device, an indication identifying data which is required by the touch-device if the user shall gain access to a specific application operation or service operation which is accessible to the user-worn-device when selected by the user with the second body-part touching the touch-device;

obtain the data required by the touch-device, according to the received indication, in response to receiving the indication;

control, in response to obtaining the data required by the touch device, the ultrasonic transducer contacting the first body-part of the user and the second body-part of the user maintaining in contact with the touch screen, to use the user's body as the data transmission medium to transmit the obtained data to the touch-device by employing the ultrasonic transducer to produce ultrasound, wherein the produced ultrasound is operable to travel from the ultrasonic transducer to the touch device via the first body-part and the second body-part, and wherein the obtained data is encoded in the produced ultrasound; and gain processor operational access to the selected application operation or service operation, in response to the obtained data being transmitted with encoding from the ultrasonic transducer to the touch device.

2. The user-worn device of claim 1, wherein the second body-part of the user is a finger of the user.

3. The user-worn device of claim 2, wherein the ultrasonic transducer comprises a phased array of ultrasonic transmitters configured for selectively focusing an acoustic energy of emitted ultrasound to at least two fingers of the user, the user-worn device being operative to transmit different data to the touch-device via the at least two fingers of the user.

4. The user-worn device of claim 1, wherein the selected data transmitted to the touch-device via the ultrasound comprises authentication credentials of the user.

5. The user-worn device of claim 1, further comprising a wristband for wearing the user-worn device around a wrist of the user.

6. The user-worn device of claim 1, wherein the indication identifying data to be transmitted to the touch-device comprises: information identifying the data to be transmitted, a location of the touch-device, and/or information identifying a service which is accessible through the touch-device.

7. A touch-device for communicating with a user-worn device being worn by a user and contacting a first body-part of the user, the touch-device comprising:

an ultrasonic transducer for transmitting data between the user-worn device and the touch-device encoded in ultrasound via the first body-part of the user and a second body-part of the user; and a processor being operative to:

transmit, to the user-worn device, in response to the second body-part of the user contacting the touch device, an indication identifying data which is required by the touch-device if the user shall gain access to a specific application operation or service operation which is accessible to the user-worn device hwhen selected by the user with the second body-part touching the touch-device;

in response to the second body-part maintaining contact with the touch-device, receive from the user-worn device via the first body-part and the second body-part, the required data that has travelled from the user-worn device to the touch-device via the first body-part and the second body-part, wherein the required data is received from the touch-device, as data encoded in the ultrasound; and authenticate access to the selected application operation or service operation, in response to receiving from the user-worn device, via the first body-part and the second body part, the required data transmitted with encoding in the ultrasound from the user-worn device.

8. The touch-device of claim 7, further comprising a touchscreen, wherein the touch-device is configured to detect that the second body-part of the user has touched the touchscreen in a particular location, and the touch-device is configured to transmit the indication identifying the data to be transmitted to the touch-device in response to the touch-device detecting that the second body-part of the user has touched the touchscreen in the particular location.

9. The touch-device of claim 8, wherein the indication identifying data to be transmitted to the touch-device is dependent on a location of touch of the second body-part of the user on the touchscreen.

10. The touch-device of claim 7, wherein the data comprises authentication credentials of the user.

11. The touch-device of claim 10, being further operative to authenticate the user in response to receiving the authentication credentials.

12. The touch-device of claim 7, wherein the ultrasonic transducer is a touchscreen comprised in the touch-device.

13. The touch-device of claim 7, being comprised in any one of: a mobile phone, a smartphone, a mobile terminal, a tablet, a computer display, a television, a door handle, a door knob, a door frame, a door panel, a device for access control, and a vending machine.

14. The touch-device of claim 7, wherein the processor is configured to transmit the indication identifying data to be transmitted to the touch-device by employing the ultrasonic transducer to produce ultrasound that travels from the ultrasonic transducer to the user-worn device via the body-part, wherein the indication identifying data to be transmitted to the touch-device is encoded in the ultrasound.

15. The user-worn device of claim 7, wherein the indication identifying data to be transmitted to the touch-device comprises: information identifying the data to be transmitted, a location of the touch-device, and/or information identifying a service which is accessible through the touch-device.

16. A method performed by a user-worn device comprising an ultrasonic transducer configured for contacting a first body-part of a user wearing the user-worn device, and transmitting data between the user-worn device and a touch-device encoded in ultrasound via a second body-part of the user contacting the touch-device, the method comprising:

receiving, from the touch-device, in response to the second body-part of the user contacting the touch device, an indication identifying data which is required by the touch-device if the user shall gain access to a specific application operation or service operation which is accessible to the user-worn device when selected by the user with the second body-part touching the touch-device, obtaining the data required by the touch-device, according to the received indication, in response to receiving the indication;

using the user's body as the data transmission medium to, in response to obtaining the data required by the touch device, the second body-part of the user contacting the touch-device, and the second body-part of the user maintaining in contact with the touch screen, transmit the obtained data to the touch-device by employing the ultrasonic transducer to produce ultrasound wherein using the user's body as a data transmission medium to transmit the selected data to the touch-device comprises employing the ultrasonic transducer to produce ultrasound that travels from the ultrasonic transducer to the touch device via the first body-part to the touch-device via the second body-part, wherein the obtained data is encoded in the produced ultrasound; and gaining processor operational access to the selected application operation or service operation, in response to the obtained data being transmitted with encoding from the ultrasonic transducer to the touch device.

17. The method of claim 16, wherein the second body-part of the user is a finger of the user.

18. A computer program product comprising a non-transitory computer-readable storage medium storing a computer program for programming a user-worn device to perform the method of claim 16.

19. The method according to claim 16, wherein the indication identifying data to be transmitted to the touch-device comprises: information identifying the data to be transmitted, a location of the touch-device, and/or information identifying a service which is accessible through the touch-device.

* * * * *

UNITED STATES PATENT AND TRADEMARK OFFICE
CERTIFICATE OF CORRECTION

PATENT NO. : 12,340,061 B2
APPLICATION NO. : 16/344711
DATED : June 24, 2025
INVENTOR(S) : Burkert et al.

It is certified that error appears in the above-identified patent and that said Letters Patent is hereby corrected as shown below:

On the Title Page

In Item (56), under "OTHER PUBLICATIONS", in Column 2, Line 3, delete "(Published" and insert -- Published --, therefor.

In the Specification

In Column 4, Line 28, delete "user be" and insert -- user --, therefor.

In Column 6, Line 13, delete "key pad" and insert -- keypad --, therefor.

In Column 6, Line 14, delete "alternatively," and insert -- alternative, --, therefor.

In Column 10, Line 57, delete "ion" and insert -- in --, therefor.

In the Claims

In Column 15, Line 55, in Claim 7, delete "hwhen" and insert -- when --, therefor.

In Column 16, Line 56, in Claim 16, delete "touch-device," and insert -- touch-device; --, therefor.

Signed and Sealed this
Thirtieth Day of December, 2025

John A. Squires
*Director of the United States Patent and Trademark Office*